(12) United States Patent
Swamidass

(10) Patent No.: US 9,246,707 B2
(45) Date of Patent: Jan. 26, 2016

(54) COST-BASED SMTP EMAIL ROUTING

(75) Inventor: Vijay Swamidass, Castro Valley, CA (US)

(73) Assignee: salesforce.com, inc., San Francisco, CA (US)

(*) Notice: Subject to any disclaimer, the term of this patent is extended or adjusted under 35 U.S.C. 154(b) by 1092 days.

(21) Appl. No.: 13/049,818

(22) Filed: Mar. 16, 2011

(65) Prior Publication Data
US 2011/0231501 A1 Sep. 22, 2011

Related U.S. Application Data

(60) Provisional application No. 61/314,303, filed on Mar. 16, 2010.

(51) Int. Cl.
G06F 15/16 (2006.01)
H04L 12/58 (2006.01)
G06Q 10/10 (2012.01)

(52) U.S. Cl.
CPC .......... H04L 12/5855 (2013.01); G06Q 10/107 (2013.01); H04L 51/14 (2013.01)

(58) Field of Classification Search
CPC .......................... G06Q 10/107; H04L 12/5825
USPC .................................................. 709/206, 204
See application file for complete search history.

(56) References Cited

U.S. PATENT DOCUMENTS

| | | | |
|---|---|---|---|
| 5,577,188 A | 11/1996 | Zhu | |
| 5,608,872 A | 3/1997 | Schwartz et al. | |
| 5,649,104 A | 7/1997 | Carleton et al. | |
| 5,715,450 A | 2/1998 | Ambrose et al. | |
| 5,761,419 A | 6/1998 | Schwartz et al. | |
| 5,819,038 A | 10/1998 | Carleton et al. | |
| 5,821,937 A | 10/1998 | Tonelli et al. | |
| 5,831,610 A | 11/1998 | Tonelli et al. | |
| 5,873,096 A | 2/1999 | Lim et al. | |
| 5,918,159 A | 6/1999 | Fomukong et al. | |
| 5,963,953 A | 10/1999 | Cram et al. | |
| 5,983,227 A | 11/1999 | Nazem et al. | |
| 6,092,083 A | 7/2000 | Brodersen et al. | |
| 6,161,149 A | 12/2000 | Achacoso et al. | |
| 6,169,534 B1 | 1/2001 | Raffel et al. | |
| 6,178,425 B1 | 1/2001 | Brodersen et al. | |
| 6,189,011 B1 | 2/2001 | Lim et al. | |

(Continued)

OTHER PUBLICATIONS

"Google Plus Users", Google+Ripples, Oct. 31, 2011 [retrieved on Feb. 21, 2012 from Internet at http://www.googleplusers.com/google-ripples.html], 3 pages.

Primary Examiner — Dustin Nguyen
Assistant Examiner — Joel Mesa
(74) Attorney, Agent, or Firm — Weaver Austin Villeneuve & Sampson LLP

(57) ABSTRACT

Methods and system for cost-based email routing is provided. Such methods and systems can route high volume of email messages with improved email throughput. Such methods and systems may involve a variety of components, for example, at least one email data store for receiving, storing, and sending high volume of email message, a plurality of mail servers for routing email messages to their recipient domains based through a lowest cost associated with sending high volume of email messages to their recipient domains from the plurality of mail servers, and at least one email processing module for measuring the cost associated with sending each email messages to its recipient domain from each of the plurality of mail servers.

22 Claims, 7 Drawing Sheets

(56) References Cited

U.S. PATENT DOCUMENTS

| | | |
|---|---|---|
| 6,216,133 B1 | 4/2001 | Masthoff |
| 6,216,135 B1 | 4/2001 | Brodersen et al. |
| 6,233,617 B1 | 5/2001 | Rothwein et al. |
| 6,236,978 B1 | 5/2001 | Tuzhilin |
| 6,266,669 B1 | 7/2001 | Brodersen et al. |
| 6,288,717 B1 | 9/2001 | Dunkle |
| 6,295,530 B1 | 9/2001 | Ritchie et al. |
| 6,324,568 B1 | 11/2001 | Diec |
| 6,324,693 B1 | 11/2001 | Brodersen et al. |
| 6,336,137 B1 | 1/2002 | Lee et al. |
| D454,139 S | 3/2002 | Feldcamp et al. |
| 6,367,077 B1 | 4/2002 | Brodersen et al. |
| 6,393,605 B1 | 5/2002 | Loomans |
| 6,405,220 B1 | 6/2002 | Brodersen et al. |
| 6,411,949 B1 | 6/2002 | Schaffer |
| 6,434,550 B1 | 8/2002 | Warner et al. |
| 6,446,089 B1 | 9/2002 | Brodersen et al. |
| 6,535,909 B1 | 3/2003 | Rust |
| 6,549,908 B1 | 4/2003 | Loomans |
| 6,553,563 B2 | 4/2003 | Ambrose et al. |
| 6,560,461 B1 | 5/2003 | Fomukong et al. |
| 6,574,635 B2 | 6/2003 | Stauber et al. |
| 6,577,726 B1 | 6/2003 | Huang et al. |
| 6,601,087 B1 | 7/2003 | Zhu et al. |
| 6,604,117 B2 | 8/2003 | Lim et al. |
| 6,604,128 B2 | 8/2003 | Diec et al. |
| 6,609,150 B2 | 8/2003 | Lee et al. |
| 6,621,834 B1 | 9/2003 | Scherpbier et al. |
| 6,654,032 B1 | 11/2003 | Zhu et al. |
| 6,665,648 B2 | 12/2003 | Brodersen et al. |
| 6,665,655 B1 | 12/2003 | Warner et al. |
| 6,684,438 B2 | 2/2004 | Brodersen et al. |
| 6,711,565 B1 | 3/2004 | Subramaniam et al. |
| 6,724,399 B1 | 4/2004 | Katchour et al. |
| 6,728,702 B1 | 4/2004 | Subramaniam et al. |
| 6,728,960 B1 | 4/2004 | Loomans et al. |
| 6,732,095 B1 | 5/2004 | Warshavsky et al. |
| 6,732,100 B1 | 5/2004 | Brodersen et al. |
| 6,732,111 B2 | 5/2004 | Brodersen et al. |
| 6,754,681 B2 | 6/2004 | Brodersen et al. |
| 6,763,351 B1 | 7/2004 | Subramaniam et al. |
| 6,763,501 B1 | 7/2004 | Zhu et al. |
| 6,768,904 B2 | 7/2004 | Kim |
| 6,772,229 B1 | 8/2004 | Achacoso et al. |
| 6,782,383 B2 | 8/2004 | Subramaniam et al. |
| 6,804,330 B1 | 10/2004 | Jones et al. |
| 6,826,565 B2 | 11/2004 | Ritchie et al. |
| 6,826,582 B1 | 11/2004 | Chatterjee et al. |
| 6,826,745 B2 | 11/2004 | Coker |
| 6,829,655 B1 | 12/2004 | Huang et al. |
| 6,842,748 B1 | 1/2005 | Warner et al. |
| 6,850,895 B2 | 2/2005 | Brodersen et al. |
| 6,850,949 B2 | 2/2005 | Warner et al. |
| 6,907,566 B1 | 6/2005 | McElfresh et al. |
| 7,062,502 B1 | 6/2006 | Kesler |
| 7,069,231 B1 | 6/2006 | Cinarkaya et al. |
| 7,069,497 B1 | 6/2006 | Desai |
| 7,100,111 B2 | 8/2006 | McElfresh et al. |
| 7,181,758 B1 | 2/2007 | Chan |
| 7,269,590 B2 | 9/2007 | Hull et al. |
| 7,289,976 B2 | 10/2007 | Kihneman et al. |
| 7,340,411 B2 | 3/2008 | Cook |
| 7,356,482 B2 | 4/2008 | Frankland et al. |
| 7,373,599 B2 | 5/2008 | McElfresh et al. |
| 7,401,094 B1 | 7/2008 | Kesler |
| 7,406,501 B2 | 7/2008 | Szeto et al. |
| 7,412,455 B2 | 8/2008 | Dillon |
| 7,454,509 B2 | 11/2008 | Boulter et al. |
| 7,508,789 B2 | 3/2009 | Chan |
| 7,599,935 B2 | 10/2009 | La Rotonda et al. |
| 7,603,331 B2 | 10/2009 | Tuzhilin et al. |
| 7,603,483 B2 | 10/2009 | Psounis et al. |
| 7,620,655 B2 | 11/2009 | Larsson et al. |
| 7,644,122 B2 | 1/2010 | Weyer et al. |
| 7,668,861 B2 | 2/2010 | Steven |
| 7,685,270 B1 * | 3/2010 | Vermeulen ......... G06Q 30/0603 370/252 |
| 7,698,160 B2 | 4/2010 | Beaven et al. |
| 7,730,478 B2 | 6/2010 | Weissman |
| 7,747,648 B1 | 6/2010 | Kraft et al. |
| 7,779,039 B2 | 8/2010 | Weissman et al. |
| 7,779,475 B2 | 8/2010 | Jakobson et al. |
| 7,827,208 B2 | 11/2010 | Bosworth et al. |
| 7,853,881 B1 | 12/2010 | Aly Assal et al. |
| 7,945,653 B2 | 5/2011 | Zuckerberg et al. |
| 8,005,896 B2 | 8/2011 | Cheah |
| 8,014,943 B2 | 9/2011 | Jakobson |
| 8,015,495 B2 | 9/2011 | Achacoso et al. |
| 8,032,297 B2 | 10/2011 | Jakobson |
| 8,073,850 B1 | 12/2011 | Hubbard et al. |
| 8,082,301 B2 | 12/2011 | Ahlgren et al. |
| 8,095,413 B1 | 1/2012 | Beaven |
| 8,095,531 B2 | 1/2012 | Weissman et al. |
| 8,095,594 B2 | 1/2012 | Beaven et al. |
| 8,103,611 B2 | 1/2012 | Tuzhilin et al. |
| 8,150,913 B2 | 4/2012 | Cheah |
| 8,209,308 B2 | 6/2012 | Rueben et al. |
| 8,209,333 B2 | 6/2012 | Hubbard et al. |
| 8,275,836 B2 | 9/2012 | Beaven et al. |
| 8,457,545 B2 | 6/2013 | Chan |
| 8,484,111 B2 | 7/2013 | Frankland et al. |
| 8,490,025 B2 | 7/2013 | Jakobson et al. |
| 8,504,945 B2 | 8/2013 | Jakobson et al. |
| 8,510,045 B2 | 8/2013 | Rueben et al. |
| 8,510,664 B2 | 8/2013 | Rueben et al. |
| 8,566,301 B2 | 10/2013 | Rueben et al. |
| 8,646,103 B2 | 2/2014 | Jakobson et al. |
| 2001/0044791 A1 | 11/2001 | Richter et al. |
| 2002/0072951 A1 | 6/2002 | Lee et al. |
| 2002/0082892 A1 | 6/2002 | Raffel et al. |
| 2002/0129352 A1 | 9/2002 | Brodersen et al. |
| 2002/0140731 A1 | 10/2002 | Subramaniam et al. |
| 2002/0143997 A1 | 10/2002 | Huang et al. |
| 2002/0162090 A1 | 10/2002 | Parnell et al. |
| 2002/0165742 A1 | 11/2002 | Robbins |
| 2003/0004971 A1 | 1/2003 | Gong |
| 2003/0018705 A1 | 1/2003 | Chen et al. |
| 2003/0018830 A1 | 1/2003 | Chen et al. |
| 2003/0066031 A1 | 4/2003 | Laane et al. |
| 2003/0066032 A1 | 4/2003 | Ramachandran et al. |
| 2003/0069936 A1 | 4/2003 | Warner et al. |
| 2003/0070000 A1 | 4/2003 | Coker et al. |
| 2003/0070004 A1 | 4/2003 | Mukundan et al. |
| 2003/0070005 A1 | 4/2003 | Mukundan et al. |
| 2003/0074418 A1 | 4/2003 | Coker et al. |
| 2003/0120675 A1 | 6/2003 | Stauber et al. |
| 2003/0151633 A1 | 8/2003 | George et al. |
| 2003/0159136 A1 | 8/2003 | Huang et al. |
| 2003/0187921 A1 | 10/2003 | Diec et al. |
| 2003/0189600 A1 | 10/2003 | Gune et al. |
| 2003/0204427 A1 | 10/2003 | Gune et al. |
| 2003/0206192 A1 | 11/2003 | Chen et al. |
| 2003/0225730 A1 | 12/2003 | Warner et al. |
| 2004/0001092 A1 | 1/2004 | Rothwein et al. |
| 2004/0010489 A1 | 1/2004 | Rio et al. |
| 2004/0015981 A1 | 1/2004 | Coker et al. |
| 2004/0027388 A1 | 2/2004 | Berg et al. |
| 2004/0128001 A1 | 7/2004 | Levin et al. |
| 2004/0186860 A1 | 9/2004 | Lee et al. |
| 2004/0193510 A1 | 9/2004 | Catahan et al. |
| 2004/0199489 A1 | 10/2004 | Barnes-Leon et al. |
| 2004/0199536 A1 | 10/2004 | Barnes Leon et al. |
| 2004/0199543 A1 | 10/2004 | Braud et al. |
| 2004/0249854 A1 | 12/2004 | Barnes-Leon et al. |
| 2004/0260534 A1 | 12/2004 | Pak et al. |
| 2004/0260659 A1 | 12/2004 | Chan et al. |
| 2004/0268299 A1 | 12/2004 | Lei et al. |
| 2005/0010644 A1 * | 1/2005 | Brown ................ G06Q 10/107 709/206 |
| 2005/0050555 A1 | 3/2005 | Exley et al. |
| 2005/0091098 A1 | 4/2005 | Brodersen et al. |
| 2005/0114262 A1 * | 5/2005 | Howard ................ G06Q 20/04 705/40 |

(56) References Cited

U.S. PATENT DOCUMENTS

| | | |
|---|---|---|
| 2006/0268722 A1* | 11/2006 | Achlioptas .......... H04L 12/5875 370/238 |
| 2008/0249972 A1 | 10/2008 | Dillon |
| 2009/0063415 A1 | 3/2009 | Chatfield et al. |
| 2009/0100342 A1 | 4/2009 | Jakobson |
| 2009/0177744 A1 | 7/2009 | Marlow et al. |
| 2011/0218958 A1 | 9/2011 | Warshavsky et al. |
| 2011/0247051 A1 | 10/2011 | Bulumulla et al. |
| 2012/0042218 A1 | 2/2012 | Cinarkaya et al. |
| 2012/0233137 A1 | 9/2012 | Jakobson et al. |
| 2012/0290407 A1 | 11/2012 | Hubbard et al. |
| 2013/0212497 A1 | 8/2013 | Zelenko et al. |
| 2013/0218948 A1 | 8/2013 | Jakobson |
| 2013/0218949 A1 | 8/2013 | Jakobson |
| 2013/0218966 A1 | 8/2013 | Jakobson |
| 2013/0247216 A1 | 9/2013 | Cinarkaya et al. |
| 2014/0359537 A1 | 12/2014 | Jackobson et al. |
| 2015/0006289 A1 | 1/2015 | Jakobson et al. |
| 2015/0007050 A1 | 1/2015 | Jakobson et al. |
| 2015/0095162 A1 | 4/2015 | Jakobson et al. |
| 2015/0142596 A1 | 5/2015 | Jakobson et al. |

* cited by examiner

COST-BASED SMTP EMAIL ROUTING

CROSS-REFERENCES TO RELATED APPLICATIONS

This application claims benefit of priority to U.S. Provisional Application 61/314,303, filed Mar. 16, 2010, which is incorporated in its entirety by reference for all purposes.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

BACKGROUND

Many embodiments described herein generally relate to sharing and accessing data, and more particularly to routing email messages. These methods and systems can be particularly effective in routing high volume email messages with minimum delivery time.

In extremely high volume email delivery environments, delivery latency across the Internet is one of the biggest factors in overall throughput (emails/second) of email delivery systems. A typical 100 ms delivery latency means that a single mail server can deliver at most 10 emails per second. If delivery latency for sending email messages could be decreased, the overall throughput of email delivery systems will increase.

While typical latencies on the Internet are in the 80-100 ms range, many regional (local) delivery latencies may be only 10-20 ms. In high volume email delivery systems, the current typical delivery latencies translate to hours of delay for email message delivery in some cases. If email messages can be routed in mass to a local mail server, the delivery latency could easily be reduced by 3-5 times and sometimes as much as 10 times. Such drop in magnitude of delivery latencies can result in significant increase in overall throughput of email delivery systems.

Accordingly, it is desirable to develop methods and systems that provide for decreased delivery latency for high volume email delivery, so that all email messages can be timely received by their recipients.

BRIEF SUMMARY

The following presents a simplified summary of some embodiments in order to provide a basic understanding. This is not intended to identify key/critical elements or to delineate the scope of the embodiments. Its sole purpose is to present some aspects and embodiments in a simplified form as a prelude to the more detailed description that is presented later.

Methods and systems for cost-based email routing are provided. Such methods and systems can route high volume of email messages with improved email throughput. These methods and systems may be particularly effective in routing high volume of email messages within the email message delivery environment. Such methods and systems may involve a variety of components, for example, at least one email data store for receiving, storing, and sending high volume of email messages, a plurality of mail servers for routing email messages to their recipient domains based through a lowest cost associated with sending high volume of email messages to their recipient domains from the plurality of mail servers, and at least one email processing module for measuring the cost associated with sending each email message to its recipient domain from each of the plurality of mail servers.

In many embodiments, a method for email messaging is provided. The method typically includes receiving a plurality of email messages for a plurality of recipient domains from one or more clients, and receiving cost information associated with sending the plurality of email messages to the plurality of recipient domains from a plurality of Mail Transfer Agents (MTAs), and determining, based on the cost information, using one or more processors in communication with one or more computer systems, a lowest cost MTA for sending a batch of email messages for each of the plurality of recipient domains, and sending the batch of email messages for each of the plurality of recipient domains using the lowest cost MTA.

In many embodiments, an email messaging system is provided. The email messaging system typically includes at least one client device configured to generate and send a plurality of email messages for a plurality of recipient domains, at least one email data store device configured to receive and store the plurality of email messages from the at least one client device, and a plurality of Mail Transfer Agents (MTAs) in operative communication with the at least one email data store and configured to transfer the email messages from the at least one data store to the plurality of recipient domains using at least one email processing module. The email processing module is configured to determine a lowest cost MTA for sending a batch of email messages for each of the plurality of recipient domains and send the batch of email messages for each of the plurality of recipient domains using the lowest cost MTA. The email processing module is configured to determine the lowest cost MTA based on cost information associated with sending the plurality of email messages to the plurality of recipient domains from the plurality of MTAs.

In many embodiments, the email message delivery system includes one or more additional features to provide additional functionality. For example, the MTAs can be geographically distant from each other. In certain embodiments, the email processing module can be implemented or integrated with other components of the email delivery system, for example, the email data store.

Reference to the remaining portions of the specification, including the drawings and claims, will realize other features and advantages of the present invention. Further features and advantages of the present invention, as well as the structure and operation of various embodiments of the present invention, are described in detail below with respect to the accompanying drawings. In the drawings, like reference numbers indicate identical or functionally similar elements.

BRIEF DESCRIPTION OF THE DRAWINGS

In the following drawings like reference numbers are used to refer to like elements. Although the following figures depict various examples of the invention, the invention is not limited to the examples depicted in the figures.

DETAILED DESCRIPTION

Systems and methods in accordance with many embodiments of the present disclosure can overcome one or more of the aforementioned and other deficiencies in existing email delivery systems. Many embodiments can provide for improved throughput as well as the ability to achieve email message delivery with the lowest possible cost. Systems and methods in accordance with many embodiments provide for general purpose, high-throughput, cost-based email delivery and routing. Such methods and systems allow for faster email delivery for high volume email delivery environments.

Methods and systems in accordance with many embodiments provide for high volume email delivery using Simple Mail Transfer Protocol (SMTP). A high volume of emails can be sent to recipients in much shorter time than current methods. The shorter delivery time allows for timely communication of time sensitive notifications to a large number of recipients. For example, a service provider may timely notify clients as soon as a service interruption happens for service subscribers.

Many embodiments can provide for a relatively shorter email processing time, which may significantly alleviate any latency and throughput issues. In many embodiments, high volume of emails are delivered using SMTP, but the high volume of emails are processed in a relatively shorter time at the MTA. In many embodiments, a shorter email processing time is realized by utilizing multiple Mail Transfer Agents (MTAs). Each MTA may only process a batch of email messages from the high volume of email messages. This parallel processing of multiple MTAs may lead to relatively shorter email processing time, which may help to minimize issues such as email latency and throughput delivery. In many embodiments, this shorter email processing time can be made even shorter by having each MTA process batches of email for a particular recipient domain.

In many embodiments, an email data store is implemented to contain email messages, such as current or historic emails. In many embodiments, the email data store receives email messages in large quantities, allowing for a large number of emails to be stored on the email data store. Such large email receipt and storage provides the email data store with the ability to prepare email batches to be sent to MTA. In certain embodiments, the email data store may be a relational database management system.

Email Routing

Figure 1:
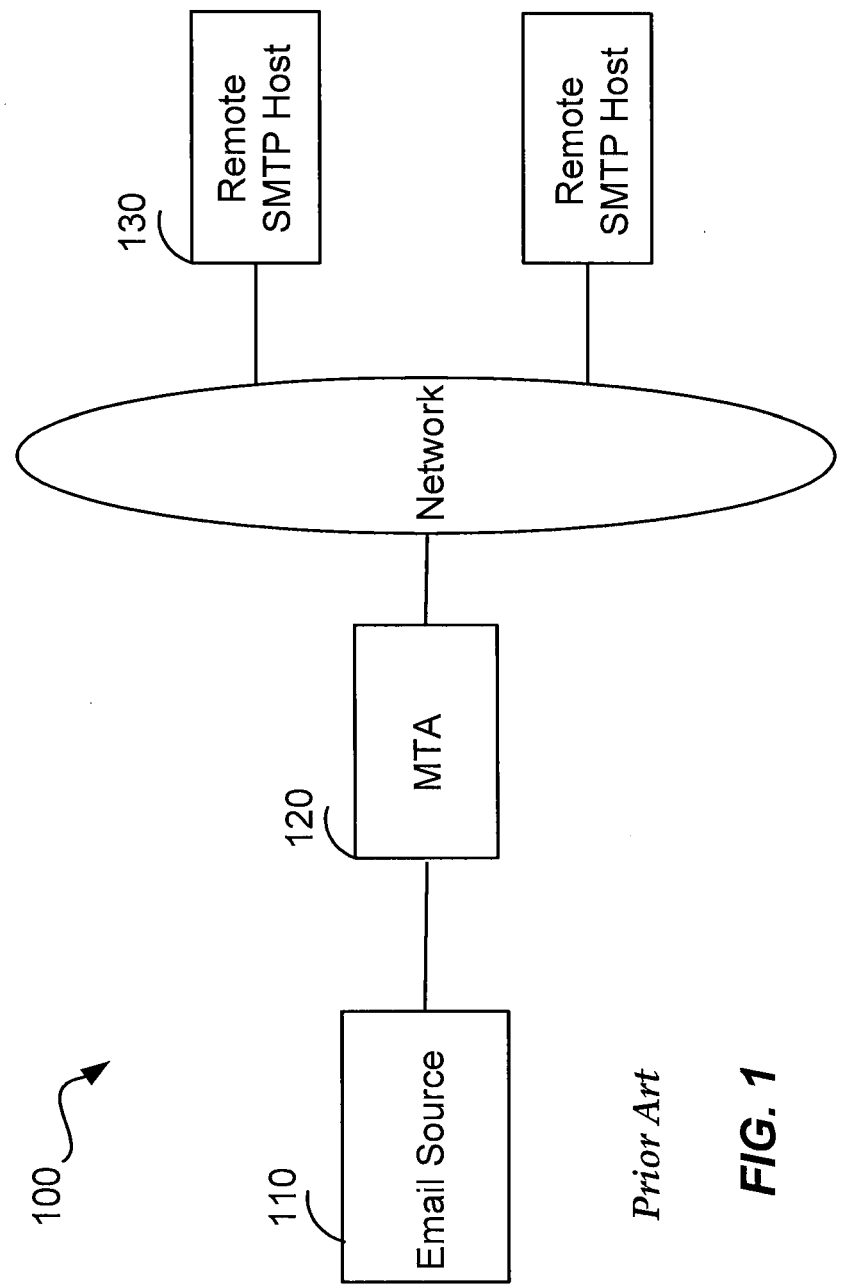
FIG. 1 illustrates a block diagram of an existing email delivery system.

When sending email messages to recipients using SMTP, an MTA is used to process email message delivery. FIG. 1 illustrates an existing email delivery within example system 100 using MTA 120 to deliver email messages to their recipients domain 130. It should be understood that the terms "recipient domain" and "remote SMTP host" are often used interchangeably herein. During the delivery of email messages, email messages are generated and sent from email source 110. Next, MTA 120 stores received email messages in a queue and processes each email message based on the recipient domain. While sending high volume of email messages from email source 110 and receiving the high volume email messages at MTA 120, a delay is introduced to system 100. For example, for a group of about 10,000 emails, an approximately 30 second to 1 minutes delay occurs.

In order to optimize the efficiency of email delivery system 100, the delay introduced to system 100 should be minimized. To minimize the delay, the queue of MTA 120 should get smaller. As will be discussed in more detail below, an email data store along with multiple MTAs can be used to minimize the delay introduced to the system 100.

Figure 2:
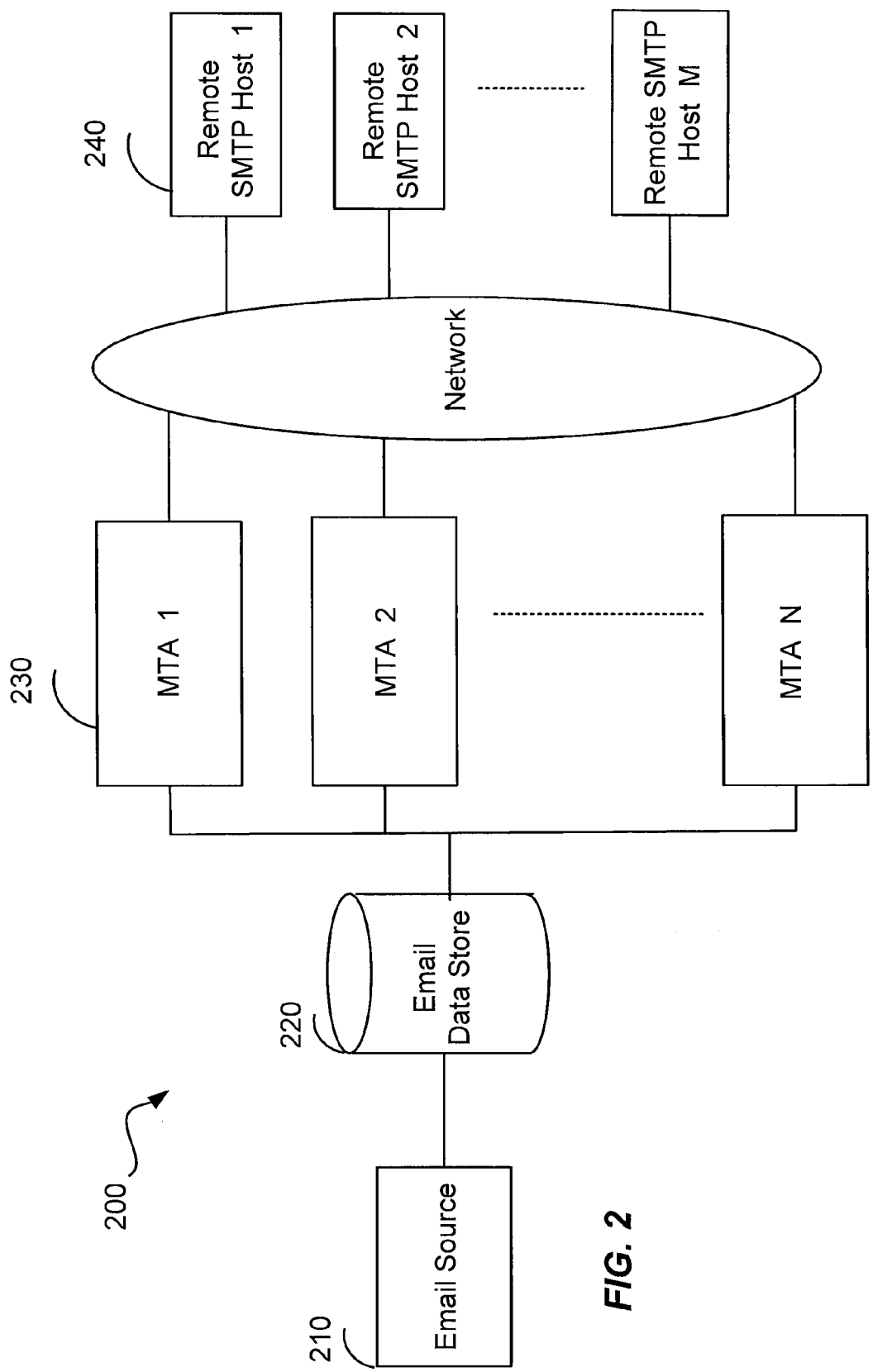
FIG. 2 illustrates a block diagram of an email delivery system in accordance with many embodiments.

FIG. 2 illustrates an example email delivery system 200 in accordance with many embodiments. System 200 includes email source 210, as described herein, which may be able to generate high volume of email messages, for sending to email data store 220. In one example, email data store 220 is able to receive and store email messages. In many embodiments, email data store 220 will be receiving a high volume of email messages in order to minimize the time required for email source 210 to send email messages. A single connection of email source 210 and email data store 220 can transfer a high volume of email messages. In this example, a single SQL connection can transfer thousands of email messages.

In some embodiments, the system 200 includes a plurality of MTAs 230 to further minimize delay in system 200 as illustrated in FIG. 2. Having a plurality of MTAs 230 results in email processing distribution, allowing for faster delivery of large number of email messages. In some embodiments, each MTA 230 may receive specific batches of email messages from email data store 220 in order to achieve more effective email processing distribution. In some embodiments, the specific batches of email messages can be grouped based on cost information associated with sending email messages to their recipient 240.

The cost information associated with sending email messages to their recipient 240 may include several factors, for example, latency associated with email message processing by MTA and receipt of email messages to the remote SMTP host. The term latency refers to any kind of delay that typically occurs in an email delivery system while processing email messages. To minimize the latency, the geographical distance between an MTA sending email messages and the remote SMTP host receiving email messages should be reduced. Accordingly, each MTA may be located in a geographically distant location from other MTAs in order to cover various remote SMTP host throughout the network. Having geographically distant MTAs allows for batches of email messages to be grouped based on location of each remote SMTP host.

Figure 3:
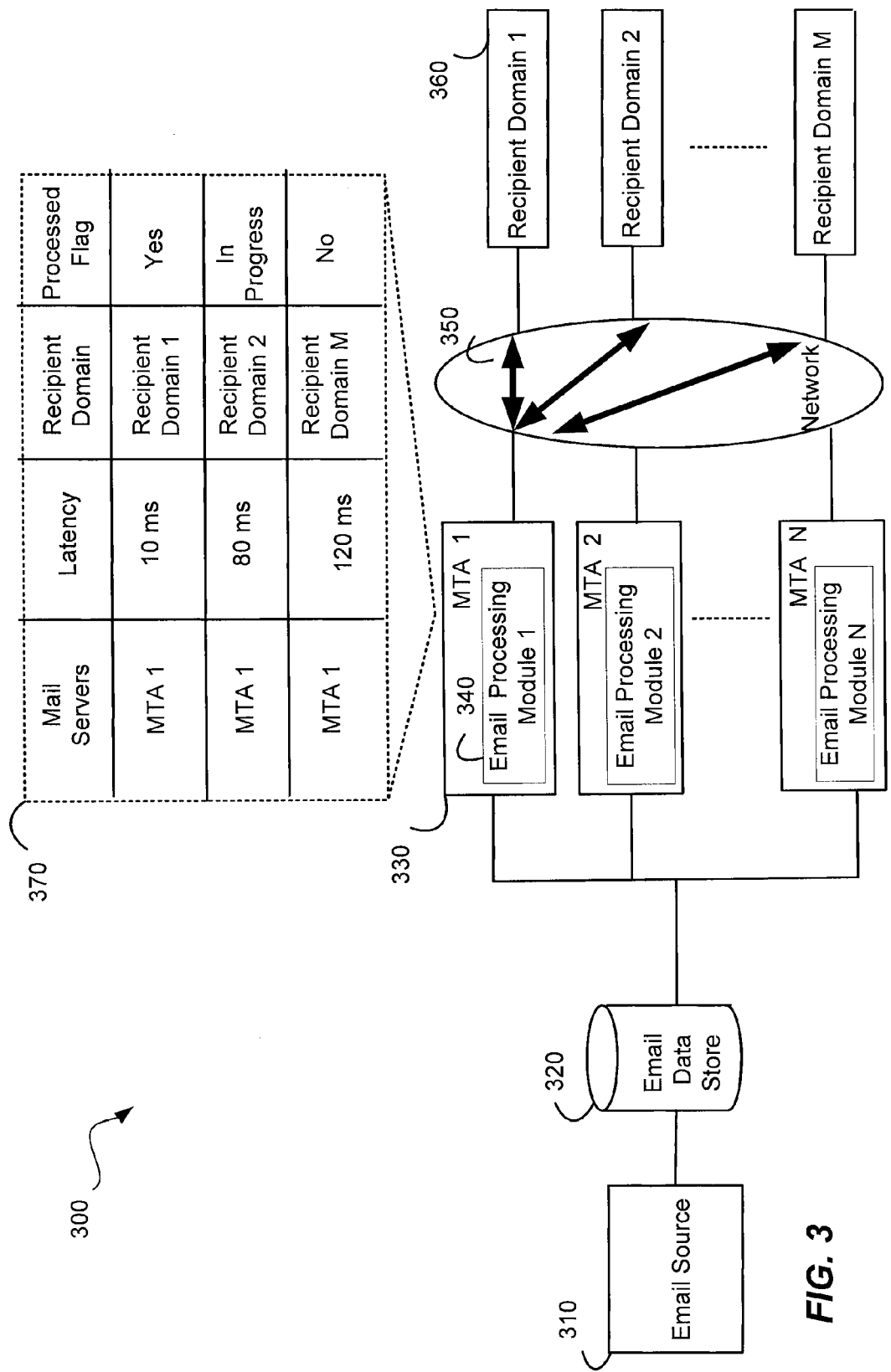
FIG. 3 illustrates a block diagram of an email delivery system illustrating latency measurements performed by each MTA, in accordance with many embodiments.

In order to ensure that the latency for email delivery system is minimized, additional components can be used. As illustrated in FIG. 3, a plurality of MTAs 330 may include email processing module(s) 340, in accordance with some embodiments. Email processing module 340 of MTA 330 can request for email messages to be sent to MTA 330 from email data store 220. Further, email processing module 340 may measure delivery latency associated with sending email messages to each available recipient domain 360 from its MTA 330. In this example, the delivery latency from each MTA 330 can be measured by sending a ping or other inquiry type message to each recipient domain 360 as shown by indicators 350 and measuring the response time for the ping or other inquiry type message. The results of latency measurements can be stored in email data store 320 and can be populated in a table. In this example, table 370 includes information for latency measurements for $MTA_1$. For each latency measurement, table 370 provides the identity of MTA 330 (e.g., $MTA_{1 \to M}$) the measurement initiated from, the identity of recipient domain 360 measured for delivery latency, and the latency measurement result. It should be understood that the latency measurement results could be gathered in a different manner as known by those skilled in the art.

Figure 4:
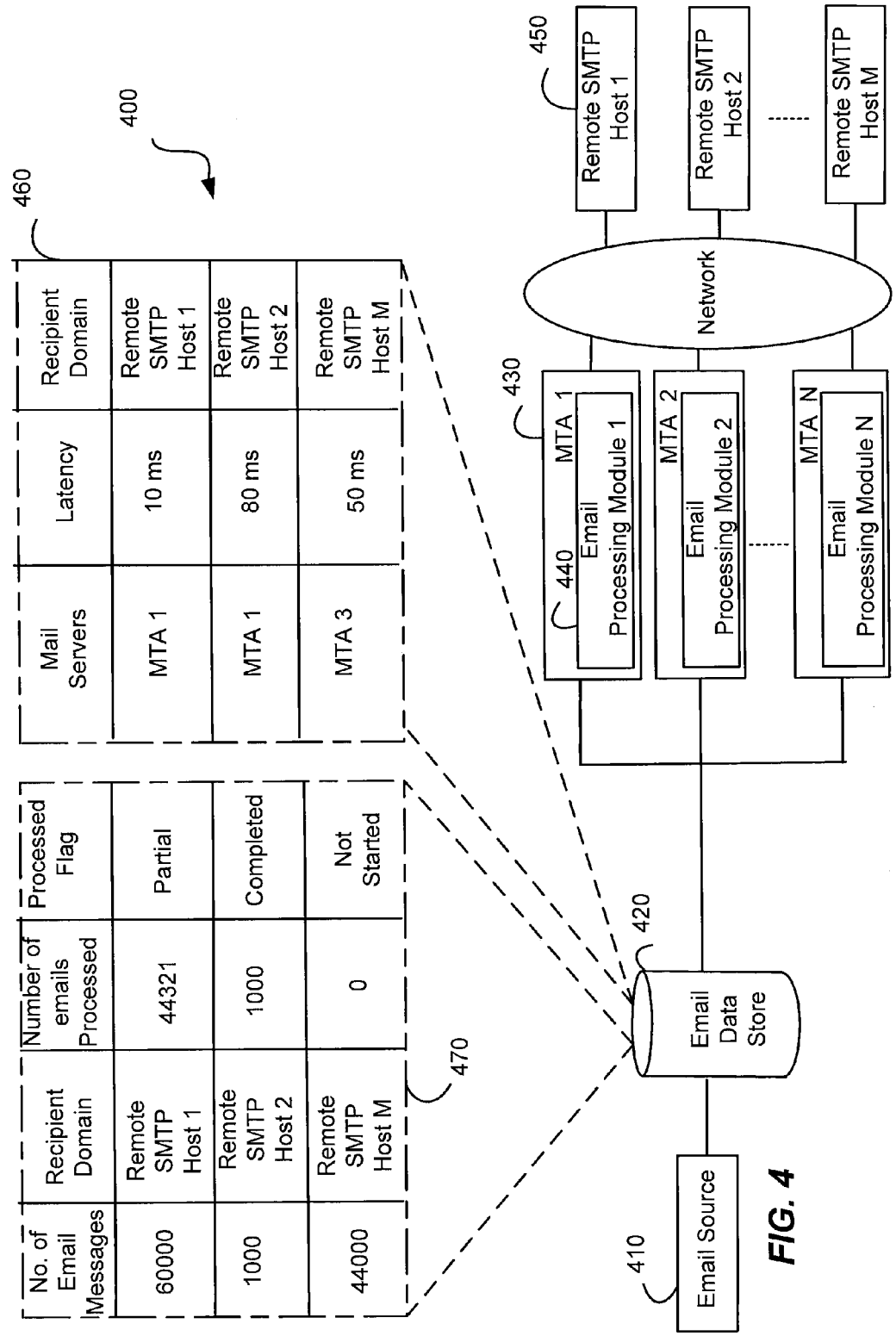
FIG. 4 illustrates a block diagram of an email delivery system illustrating email delivery processing information stored by an email data store, in accordance with many embodiments.

FIG. 4 illustrates email delivery processing information stored by email data store 420 according to one embodiment. A series of delivery latency measurements are populated in table 460. While the table 460 can be of any size, in this specific example, only three rows of the table 460 is shown. Each entry of table 460 is received from email processing module 440. As can be seen, table 460 contains a set of delivery latency measurements measured for all available MTAs 430 throughout the network. Email data store 420 also includes table 470 having information about number of email to be processed, number of emails processed so far, and a flag (i.e. status indicator) indicating the process status for each recipient domain 450. While the table 470 can be of any size, in this specific example, only three rows of the table 470 is shown.

Having information contained in tables 460 and 470 allows for grouping and sending batches of email messages having the same recipient domain 450 or having recipients domains 450 that are in a geographical proximity of each other. Batches of email messages can be sent from email data store 420 in response to a request for email messages from each MTA 430. According to certain embodiments, each batch of email messages is sent to MTA 430 with the smallest delivery latency measurement result for recipient domain(s) 450 of email messages in each batch. In some embodiments, separate batches of email for recipient domain 450 may be sent to multiple MTAs 430 based on a number of email messages requested from each MTA 430, the operational speed of each MTA 430, and delivery latency measurement information of each MTA 430.

Figure 5:
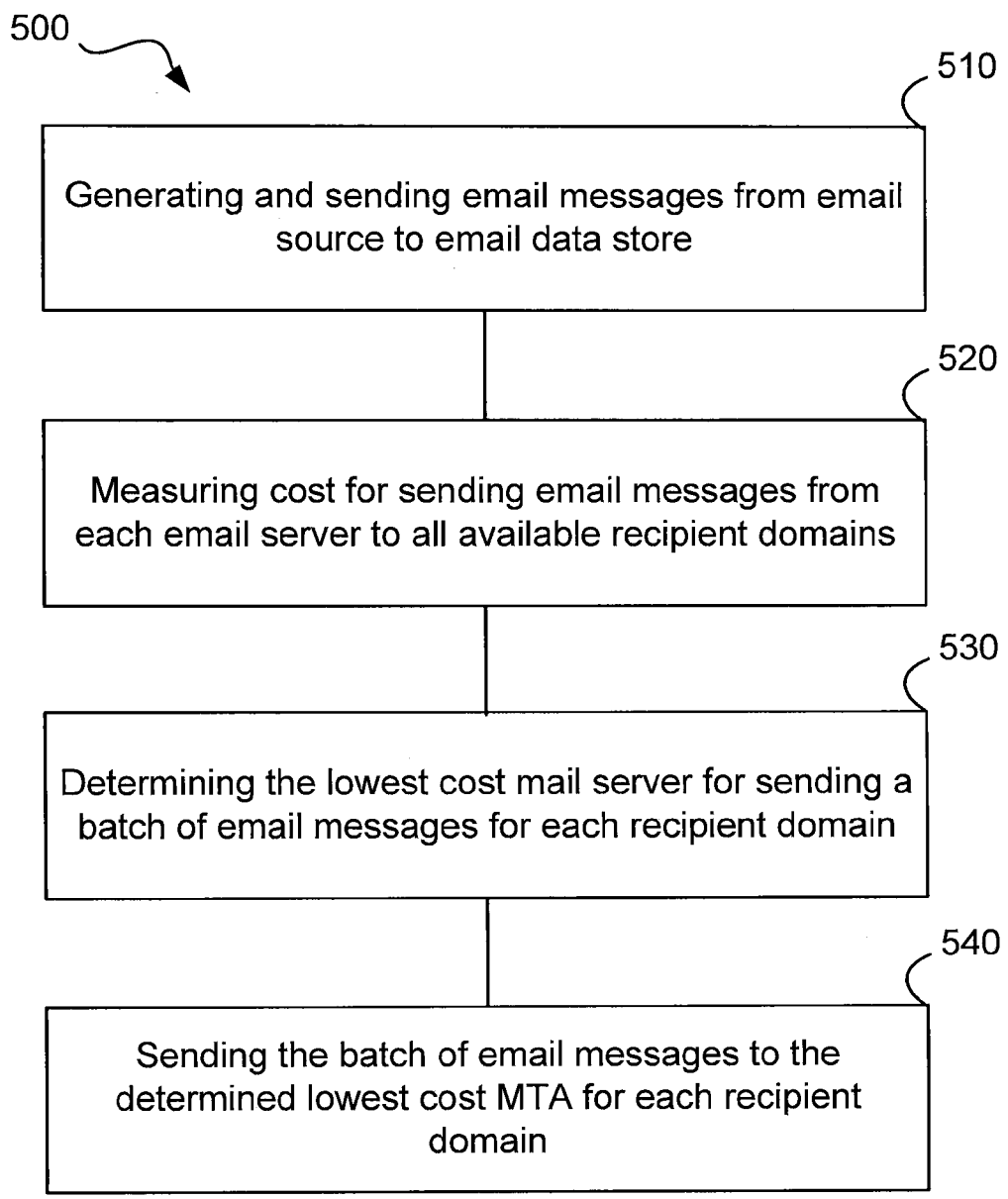
FIG. 5 illustrates a flow diagram of an email delivery processing method, in accordance with many embodiments.

FIG. 5 illustrates a flow chart of method 500 for processing email messages in email delivery system 400, in accordance with many embodiments. It should be appreciated that the steps illustrated in FIG. 5 are not necessarily performed in the example sequence and may be performed concurrently or in a different order according to certain embodiments. In step 510, email messages are generated and sent (e.g., using an email source 210, 310, and 410 as discussed above with reference to FIGS. 2-4, respectively). In many embodiments, high volume of email messages are generated for a large volume of recipients for urgent notifications.

In step 520, the cost information associated with sending email messages from in email server to each available recipient domain on the network is measured (e.g., using an email processing module 340 and 440 as discussed above with reference to FIGS. 3-4, respectively). In many embodiments, the email processing module is integrated with a mail server (e.g., an MTA 230, 330, and 430 as discussed above with reference to FIGS. 2-4, respectively). In certain embodiments, the email processing module may be implemented as a separate entity or integrated with other system components (e.g., the email data store 220, 320, and 430 as discussed above with reference to FIGS. 2-4, respectively). In certain embodiments, the cost information associated with sending email messages includes delivery latency measurements for sending an email from a mail server to the recipient domain. In certain aspects, the delivery latency measurement includes sending a ping message to a recipient domain from a mail server and determining the response time for the ping message. The latency measurement then can be sent to the email data store to be stored and gathered in a centralized location, in accordance with some embodiments.

In step 530, the lowest cost mail server for sending a batch of email messages for each recipient domain is determined. In some embodiments, stored delivery latency measurements are populated in a table (e.g., table 460 as discussed above with reference to FIG. 4). In certain aspects, each delivery latency measurement from mail servers for each recipient domain is analyzed, and the mail server with the lowest latency measurement is determined.

In step 540, the batch of email messages is sent from the email data store to the determined lowest cost email server. In certain embodiments, as the batch of email messages is sent, a flag or an indicator is set indicating that the sent batch of email messages are being processed. In certain aspects, the set flag or indicator can be placed in a table (e.g., table 470 as discussed above with reference to FIG. 4).

In certain aspects, the email delivery system can be particularly useful for sending high volume email messages to remote user systems form an on-demand database and/or application service environment. It should be appreciated that the techniques described herein are generic and can be used with any e-mail system and are also not specific to any particular database or programming technology.

System Overview

As used herein, the term multi-tenant database system refers to those systems in which various elements of hardware and software of the database system may be shared by one or more customers. For example, a given application server (e.g. running an application process) may simultaneously process requests for a great number of customers, and a given database table may store rows for a potentially much greater number of customers. As used herein, the term query or query plan refers to a set of steps used to access information in a database system.

Figure 6:
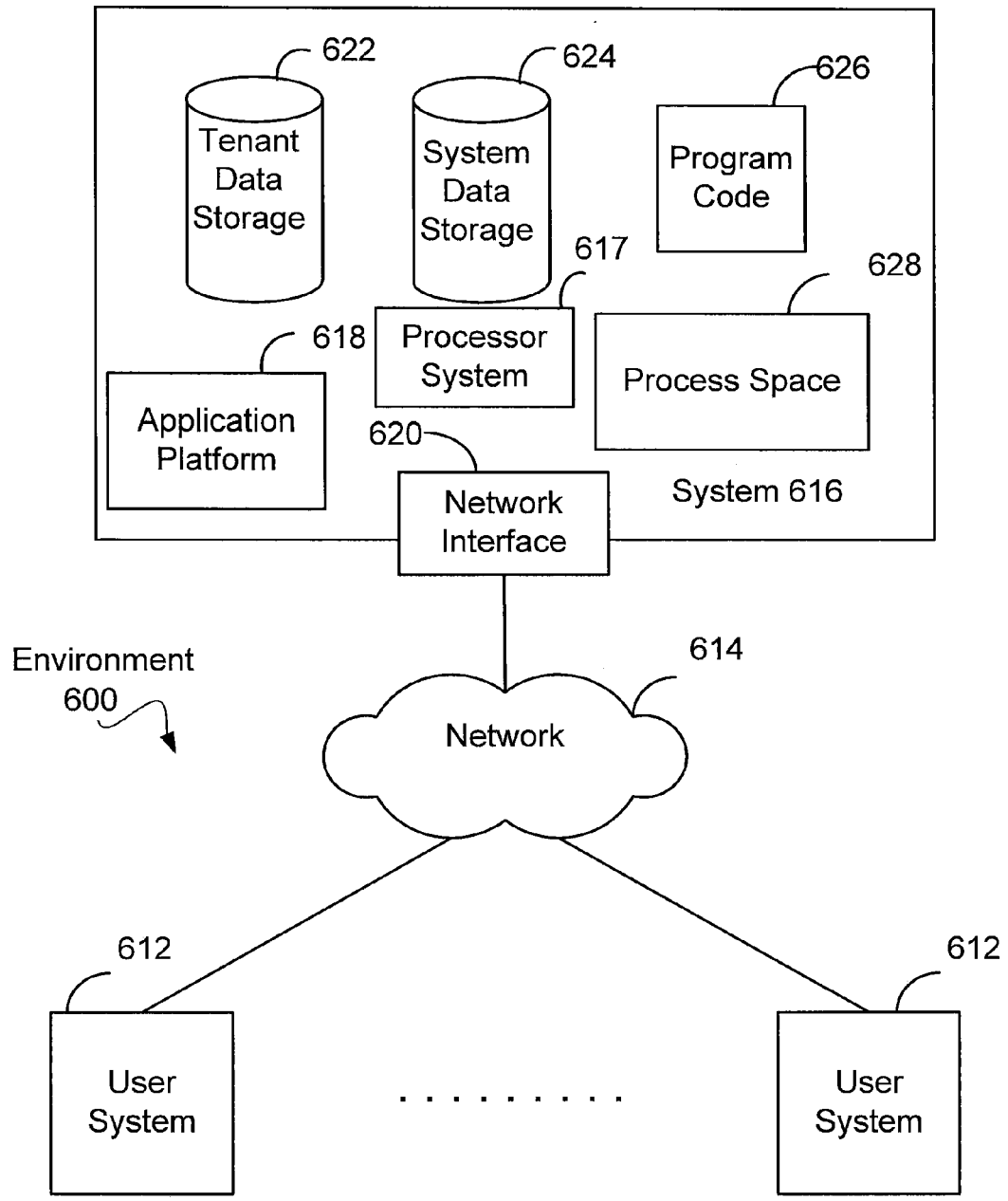
FIG. 6 illustrates a block diagram of an environment wherein the email delivery system might be used, in accordance with many embodiments.

FIG. 6 illustrates a block diagram of an environment 600 wherein an on-demand database service might be used. Environment 600 may include user systems 612, network 614, system 616, processor system 617, application platform 618, network interface 620, tenant data storage 622, system data storage 624, program code 626, and process space 628. In other embodiments, environment 600 may not have all of the components listed and/or may have other elements instead of, or in addition to, those listed above.

Environment 600 is an environment in which an on-demand database service exists. User system 612 may be any machine or system that is used by a user to access a database user system. For example, any of user systems 612 can be a handheld computing device, a mobile phone, a laptop computer, a work station, and/or a network of computing devices. As illustrated in FIG. 6 (and in more detail in FIG. 7) user systems 612 might interact via a network 614 with an on-demand database service, which is system 616.

An on-demand database service, such as system 616, is a database system that is made available to outside users that do not need to necessarily be concerned with building and/or maintaining the database system, but instead may be available for their use when the users need the database system (e.g., on the demand of the users). Some on-demand database services may store information from one or more tenants stored into tables of a common database image to form a multi-tenant database system (MTS). Accordingly, "on-demand database service 616" and "system 616" will be used interchangeably herein. A database image may include one or more database objects. A relational database management system (RDMS) or the equivalent may execute storage and retrieval of information against the database object(s). Application platform 618 may be a framework that allows the applications of system 616 to run, such as the hardware and/or software, e.g., the operating system. In an embodiment, on-demand database service 616 may include an application platform 618 that enables creation, managing and executing one or more applications developed by the provider of the on-demand database service, users accessing the on-demand database service via user systems 612, or third party application developers accessing the on-demand database service via user systems 612.

The users of user systems 612 may differ in their respective capacities, and the capacity of a particular user system 612 might be entirely determined by permissions (permission levels) for the current user. For example, where a salesperson is using a particular user system 612 to interact with system 616, that user system has the capacities allotted to that salesperson. However, while an administrator is using that user system to interact with system 616, that user system has the capacities allotted to that administrator. In systems with a hierarchical role model, users at one permission level may have access to applications, data, and database information accessible by a lower permission level user, but may not have access to certain applications, database information, and data accessible by a user at a higher permission level. Thus, different users will have different capabilities with regard to accessing and modifying application and database information, depending on a user's security or permission level.

Network 614 is any network or combination of networks of devices that communicate with one another. For example, network 614 can be any one or any combination of a LAN (local area network), WAN (wide area network), telephone network, wireless network, point-to-point network, star network, token ring network, hub network, or other appropriate configuration. As the most common type of computer network in current use is a TCP/IP (Transfer Control Protocol and Internet Protocol) network, such as the global internetwork of networks often referred to as the "Internet" with a capital "I," that network will be used in many of the examples herein. However, it should be understood that the networks that the present invention might use are not so limited, although TCP/IP is a frequently implemented protocol.

User systems 612 might communicate with system 616 using TCP/IP and, at a higher network level, use other common Internet protocols to communicate, such as HTTP, FTP, AFS, WAP, etc. In an example where HTTP is used, user system 612 might include an HTTP client commonly referred to as a "browser" for sending and receiving HTTP messages to and from an HTTP server at system 616. Such an HTTP server might be implemented as the sole network interface between system 616 and network 614, but other techniques might be used as well or instead. In some implementations, the interface between system 616 and network 614 includes load sharing functionality, such as round-robin HTTP request distributors to balance loads and distribute incoming HTTP requests evenly over a plurality of servers. At least as for the users that are accessing that server, each of the plurality of servers has access to the MTS' data; however, other alternative configurations may be used instead.

In one embodiment, system 616, shown in FIG. 6, implements a web-based customer relationship management (CRM) system. For example, in one embodiment, system 616 includes application servers configured to implement and execute CRM software applications (application processes) as well as provide related data, code, forms, web pages and other information to and from user systems 612 and to store to, and retrieve from, a database system related data, objects, and Webpage content. With a multi-tenant system, data for multiple tenants may be stored in the same physical database object, however, tenant data typically is arranged so that data of one tenant is kept logically separate from that of other tenants so that one tenant does not have access to another tenant's data, unless such data is expressly shared. In certain embodiments, system 616 implements applications other than, or in addition to, a CRM application. For example, system 616 may provide tenant access to multiple hosted (standard and custom) applications, including a CRM application. User (or third party developer) applications, which may or may not include CRM, may be supported by the application platform 618, which manages creation, storage of the applications into one or more database objects and executing of the applications in a virtual machine in the process space of the system 616.

One arrangement for elements of system 616 is shown in FIG. 6, including a network interface 620, application platform 618, tenant data storage 622 for tenant data 623, system data storage 624 for system data 625 accessible to system 616 and possibly multiple tenants, program code 626 for implementing various functions of system 616, and a process space 628 for executing MTS system processes and tenant-specific processes, such as running applications as part of an application hosting service. Additional processes that may execute on system 616 include database indexing processes.

Several elements in the system shown in FIG. 6 include conventional, well-known elements that are explained only briefly here. For example, each user system 612 could include a desktop personal computer, workstation, laptop, PDA, cell phone, or any wireless access protocol (WAP) enabled device or any other computing device capable of interfacing directly or indirectly to the Internet or other network connection. User system 612 typically runs an HTTP client, e.g., a browsing program, such as Microsoft's Internet Explorer browser, Netscape's Navigator browser, Opera's browser, or a WAP-enabled browser in the case of a cell phone, PDA or other wireless device, or the like, allowing a user (e.g., subscriber of the multi-tenant database system) of user system 612 to access, process and view information, pages and applications available to it from system 616 over network 614. Each user system 612 also typically includes one or more user interface devices, such as a keyboard, a mouse, trackball, touch pad, touch screen, pen or the like, for interacting with a graphical user interface (GUI) provided by the browser on a display (e.g., a monitor screen, LCD display, etc.) in conjunction with pages, forms, applications and other information provided by system 616 or other systems or servers. For example, the user interface device can be used to access data and applications hosted by system 616, and to perform searches on stored data, and otherwise allow a user to interact with various GUI pages that may be presented to a user. As discussed above, embodiments are suitable for use with the Internet, which refers to a specific global internetwork of networks. However, it should be understood that other networks can be used instead of the Internet, such as an intranet, an extranet, a virtual private network (VPN), a non-TCP/IP based network, any LAN or WAN or the like.

According to one embodiment, each user system 612 and all of its components are operator configurable using applications, such as a browser, including computer code run using a central processing unit such as an Intel Pentium® processor or the like. Similarly, system 616 (and additional instances of an MTS, where more than one is present) and all of their components might be operator configurable using application(s) including computer code to run using a central processing unit such as processor system 617, which may include an Intel Pentium® processor or the like, and/or multiple processor units. A computer program product embodiment includes a machine-readable storage medium (media) having instructions stored thereon/in which can be used to program a computer to perform any of the processes of the embodiments described herein. Computer code for operating and configuring system 616 to intercommunicate and to process web pages, applications and other data and media content as described herein are preferably downloaded and stored on a hard disk, but the entire program code, or portions thereof, may also be stored in any other volatile or non-volatile memory medium or device as is well known, such as a ROM or RAM, or provided on any media capable of storing program code, such as any type of rotating media including floppy disks, optical discs, digital versatile disk (DVD), compact disk (CD), microdrive, and magneto-optical disks, and magnetic or optical cards, nanosystems (including molecular memory ICs), or any type of media or device suitable for storing instructions and/or data. Additionally, the entire program code, or portions thereof, may be transmitted and downloaded from a software source over a transmission medium, e.g., over the Internet, or from another server, as is well known, or transmitted over any other conventional network connection as is well known (e.g., extranet, VPN, LAN, etc.) using any communication medium and protocols (e.g., TCP/IP, HTTP, HTTPS, Ethernet, etc.) as are well known. It will also be appreciated that computer code for implementing embodiments of the present invention can be implemented in any programming language that can be executed on a client system and/or server or server system such as, for example, C, C++, HTML, any other markup language, Java™, JavaScript, ActiveX, any other scripting language, such as VBScript, and many other programming languages as are well known may be used. (Java™ is a trademark of Sun Microsystems, Inc.).

According to one embodiment, each system 616 is configured to provide web pages, forms, applications, data and media content to user (client) systems 612 to support the access by user systems 612 as tenants of system 616. As such, system 616 provides security mechanisms to keep each tenant's data separate unless the data is shared. If more than one MTS is used, they may be located in close proximity to one another (e.g., in a server farm located in a single building or campus), or they may be distributed at locations remote from one another (e.g., one or more servers located in city A and one or more servers located in city B). As used herein, each MTS could include one or more logically and/or physically connected servers distributed locally or across one or more geographic locations. Additionally, the term "server" is meant to include a computer system, including processing hardware and process space(s), and an associated storage system and database application (e.g., OODBMS or RDBMS) as is well known in the art. It should also be understood that "server system" and "server" are often used interchangeably herein. Similarly, the database object described herein can be implemented as single databases, a distributed database, a collection of distributed databases, a database with redundant online or offline backups or other redundancies, etc., and might include a distributed database or storage network and associated processing intelligence.

Figure 7:
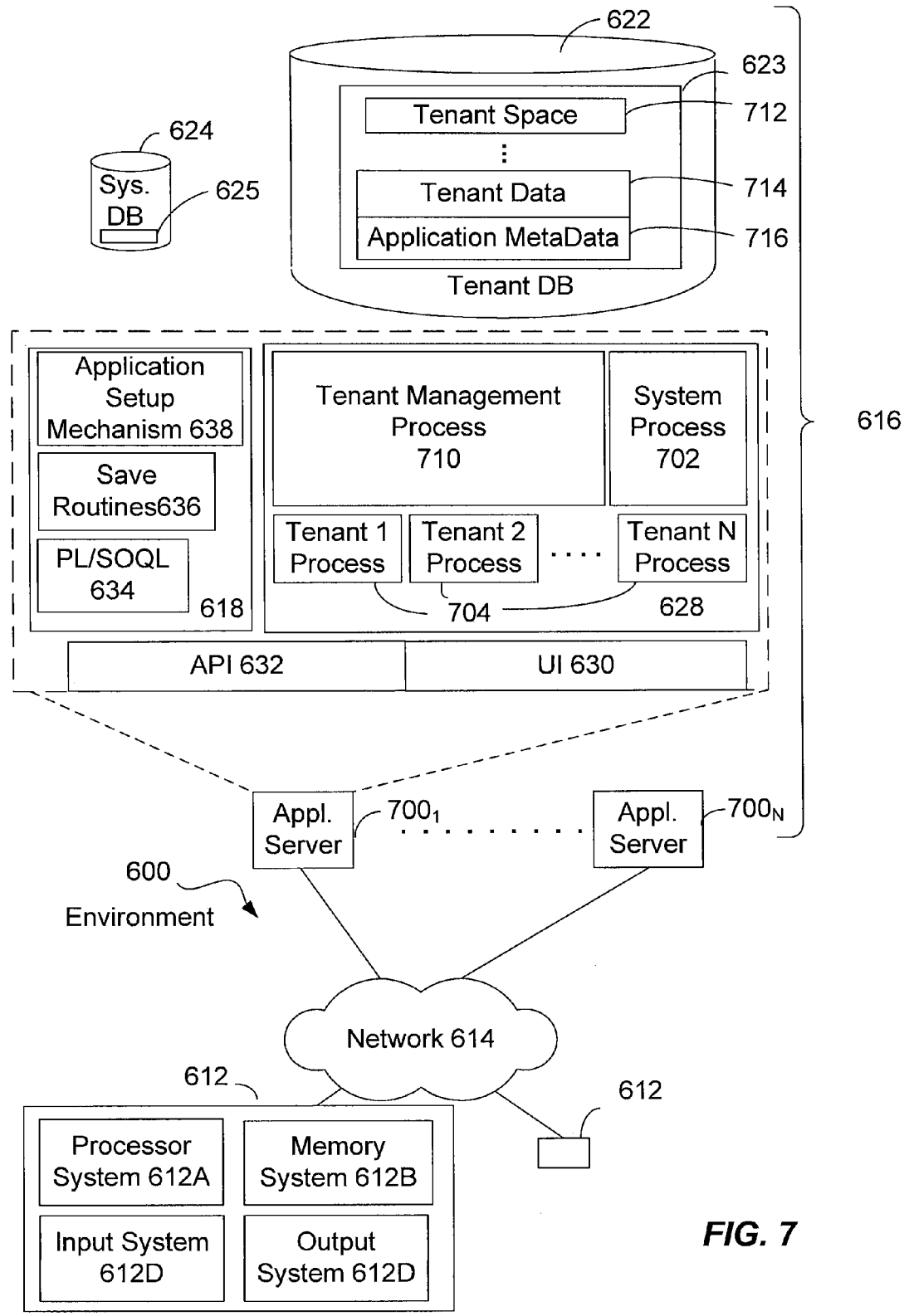
FIG. 7 illustrates a block diagram of an embodiment of elements of FIG. 6 and various possible interconnections between these elements, in accordance with many embodiments.

FIG. 7 also illustrates environment 600. However, in FIG. 7 elements of system 616 and various interconnections in an embodiment are further illustrated. FIG. 7 shows that user system 612 may include processor system 612A, memory system 612B, input system 612C, and output system 612D. FIG. 7 shows network 614 and system 616. FIG. 7 also shows that system 616 may include tenant data storage 622, tenant data 623, system data storage 624, system data 625, User Interface (UI) 630, Application Program Interface (API) 632, PL/SOQL 634, save routines 636, application setup mechanism 638, applications servers $700_1$-$700_N$, system process space 702, tenant process spaces 704, tenant management process space 710, tenant storage area 712, user storage 714, and application metadata 716. In other embodiments, environment 600 may not have the same elements as those listed above and/or may have other elements instead of, or in addition to, those listed above.

User system 612, network 614, system 616, tenant data storage 622, and system data storage 624 were discussed above in FIG. 6. Regarding user system 612, processor system 612A may be any combination of one or more processors. Memory system 612B may be any combination of one or more memory devices, short term, and/or long term memory. Input system 612C may be any combination of input devices, such as one or more keyboards, mice, trackballs, scanners, cameras, and/or interfaces to networks. Output system 612D may be any combination of output devices, such as one or more monitors, printers, and/or interfaces to networks. As shown by FIG. 7, system 616 may include a network interface 620 (of FIG. 6) implemented as a set of HTTP application servers 700, an application platform 618, tenant data storage 622, and system data storage 624. Also shown is system process space 702, including individual tenant process spaces 704 and a tenant management process space 710. Each application server 700 may be configured to tenant data storage 622 and the tenant data 623 therein, and system data storage 624 and the system data 625 therein to serve requests of user systems 612. The tenant data 623 might be divided into individual tenant storage areas 712, which can be either a physical arrangement and/or a logical arrangement of data. Within each tenant storage area 712, user storage 714 and application metadata 716 might be similarly allocated for each user. For example, a copy of a user's most recently used (MRU) items might be stored to user storage 714. Similarly, a copy of MRU items for an entire organization that is a tenant might be stored to tenant storage area 712. A UI 630 provides a user interface and an API 632 provides an application programmer interface to system 616 resident processes to users and/or developers at user systems 612. The tenant data and the system data may be stored in various databases, such as one or more Oracle™ databases.

Application platform 618 includes an application setup mechanism 638 that supports application developers' creation and management of applications, which may be saved as metadata into tenant data storage 622 by save routines 636 for execution by subscribers as one or more tenant process spaces 704 managed by tenant management process 710 for example. Invocations to such applications may be coded using PL/SOQL 634 that provides a programming language style interface extension to API 632. Invocations to applications may be detected by one or more system processes, which manages retrieving application metadata 716 for the subscriber making the invocation and executing the metadata as an application in a virtual machine.

Each application server 700 may be communicably coupled to database systems, e.g., having access to system data 625 and tenant data 623, via a different network connection. For example, one application server $700_1$ might be coupled via the network 614 (e.g., the Internet), another application server $700_{N-1}$ might be coupled via a direct network link, and another application server $700_N$ might be coupled by yet a different network connection. Transfer Control Protocol and Internet Protocol (TCP/IP) are typical protocols for communicating between application servers 700 and the database system. However, it will be apparent to one skilled in the art that other transport protocols may be used to optimize the system depending on the network interconnect used.

In certain embodiments, each application server 700 is configured to handle requests for any user associated with any organization that is a tenant. Because it is desirable to be able to add and remove application servers from the server pool at any time for any reason, there is preferably no server affinity for a user and/or organization to a specific application server 700. In one embodiment, therefore, an interface system implementing a load balancing function (e.g., an F5 Big-IP load balancer) is communicably coupled between the application servers 700 and the user systems 612 to distribute requests to the application servers 700. In one embodiment, the load balancer uses a least connections algorithm to route user requests to the application servers 700. Other examples of load balancing algorithms, such as round robin and observed response time, also can be used. For example, in certain embodiments, three consecutive requests from the same user could hit three different application servers 700, and three requests from different users could hit the same application server 700. In this manner, system 616 is multi-tenant, wherein system 616 handles storage of, and access to, different objects, data and applications across disparate users and organizations.

As an example of storage, one tenant might be a company that employs a sales force where each salesperson uses system 616 to manage their sales process. Thus, a user might maintain contact data, leads data, customer follow-up data, performance data, goals and progress data, etc., all applicable to that user's personal sales process (e.g., in tenant data storage 622). In an example of a MTS arrangement, since all of the data and the applications to access, view, modify, report, transmit, calculate, etc., can be maintained and accessed by a user system having nothing more than network access, the user can manage his or her sales efforts and cycles from any of many different user systems. For example, if a salesperson is visiting a customer and the customer has Internet access in their lobby, the salesperson can obtain critical updates as to that customer while waiting for the customer to arrive in the lobby.

While each user's data might be separate from other users' data regardless of the employers of each user, some data might be organization-wide data shared or accessible by a plurality of users or all of the users for a given organization that is a tenant. Thus, there might be some data structures managed by system 616 that are allocated at the tenant level while other data structures might be managed at the user level. Because an MTS might support multiple tenants including possible competitors, the MTS should have security protocols that keep data, applications, and application use separate. Also, because many tenants may opt for access to an MTS rather than maintain their own system, redundancy, up-time, and backup are additional functions that may be implemented in the MTS. In addition to user-specific data and tenant-specific data, system 616 might also maintain system level data usable by multiple tenants or other data. Such system level data might include industry reports, news, postings, and the like that are sharable among tenants.

In certain embodiments, user systems 612 (which may be client systems) communicate with application servers 700 to request and update system-level and tenant-level data from system 616 that may require sending one or more queries to tenant data storage 622 and/or system data storage 624. System 616 (e.g., an application server 700 in system 616) automatically generates one or more SQL statements (e.g., one or more SQL queries) that are designed to access the desired information. System data storage 624 may generate query plans to access the requested data from the database.

A table generally contains one or more data categories logically arranged as columns or fields in a viewable schema. Each row or record of a table contains an instance of data for each category defined by the fields. For example, a CRM database may include a table that describes a customer with fields for basic contact information such as name, address, phone number, fax number, etc. Another table might describe a purchase order, including fields for information such as customer, product, sale price, date, etc. Yet another table or object might describe an Opportunity, including fields such as organization, period, forecast type, user, territory, etc.

In some multi-tenant database systems, tenants may be allowed to create and store custom objects, or they may be allowed to customize standard entities or objects, for example by creating custom fields for standard objects, including custom index fields. U.S. Pat. No. 7,779,039, issued on Aug. 17, 2010, entitled "Custom Entities and Fields in a Multi-Tenant Database System", and which is hereby incorporated herein by reference, teaches systems and methods for creating custom objects as well as customizing standard objects in a multi-tenant database system.

While the invention has been described by way of example and in terms of the specific embodiments, it is to be understood that the invention is not limited to the disclosed embodiments. To the contrary, it is intended to cover various modifications and similar arrangements as would be apparent to those skilled in the art. Therefore, the scope of the appended claims should be accorded the broadest interpretation so as to encompass all such modifications and similar arrangements.

What is claimed is:

1. A method of cost-based email message routing, the method comprising:
   receiving a plurality of email messages for a plurality of recipient domains from one or more clients;
   receiving cost information associated with sending the plurality of email messages to the plurality of recipient domains from a plurality of Mail Transfer Agents (MTAs), the cost information indicating both latency associated with processing one or more email messages by one or more of the plurality of MTAs, and latency associated with receipt of the one or more email messages by one or more remote hosts;
   maintaining, using a database system, a database storing data objects identifying one or more process flags for each of the MTAs, the one or more process flags for an MTA configured to indicate a status of one or more email messages processed by the MTA;
   grouping, based on one or more of the process flags, ones of the plurality of email messages having the same recipient domain or having recipient domains in geographical proximity to each other to produce one or more batches of email messages;
   determining, based on the cost information, using one or more processors in communication with one or more computer systems, a lowest cost MTA for sending each of the one or more batches of email messages;
   sending each of the one or more batches of email messages using the lowest cost MTA; and
   updating, responsive to sending each of the one or more batches of email messages, one or more of the process flags for the lowest cost MTA to reflect that each of the one or more batches of email messages have been sent.

2. The method of claim 1, wherein the plurality of MTAs are geographically distant from each other.

3. The method of claim 1, wherein the cost information associated with sending the plurality of email messages is determined by the plurality of MTAs.

4. The method of claim 3, wherein the cost information includes delivery latency information.

5. The method of claim 3, wherein the cost information indicates response times of the plurality of recipient domains to inquiries made from the plurality of MTAs.

6. The method of claim 1 further comprising:
identifying the plurality of recipient domains for the plurality of email messages;
arranging the plurality of email messages based at least in part upon the plurality of identified recipient domains; and
sending the arranged plurality of email messages to the lowest cost MTA of each of the plurality of identified recipient domains.

7. The method of claim 1, wherein determining the one or more MTAs further comprises:
receiving one or more requests from the plurality of MTAs for a selection of the plurality of email messages having a particular recipient domain;
analyzing the one or more requests from the plurality of MTAs based at least in part upon the cost information; and
identifying a lowest cost MTA associated with sending the selection of the plurality of the email messages to the particular recipient domain.

8. The method of claim 1, wherein each of the plurality of MTAs determines a lowest cost recipient domain for transferring each email message.

9. The method of claim 8, wherein each of the plurality of MTAs requests for email massages having the determined lowest cost recipient domain.

10. The method of claim 8, wherein the determined lowest cost recipient domain is determined based at least in part upon latency measurements.

11. The method of claim 1 further comprising:
maintaining, using a database system, a database storing data objects identifying one or more latency measurements associated with one or more of the plurality of MTAs;
obtaining, by the database system, one or more additional latency measurements associated with one or more of the plurality of MTAs; and
updating, responsive to obtaining the one or more additional latency measurements, one or more data objects in the database.

12. A system for cost-based email message routing, the system comprising:
at least one client device configured to generate and send a plurality of email messages for a plurality of recipient domains;
at least one email data store device configured to receive and store the plurality of email messages from the at least one client device;
a plurality of Mail Transfer Agents (MTAs) in operative communication with the at least one email data store and configured to transfer the email messages from the at least one data store to the plurality of recipient domains; and
at least one email processing module configured to:
access a database maintained using a database system, the database storing data objects identifying one or more process flags for each of the MTAs, the one or more process flags for an MTA configured to indicate a status of one or more email messages processed by the MTA;
group, based on one or more of the process flags, ones of the plurality of email messages having the same recipient domain or having recipient domains in geographical proximity to each other to produce one or more batches of email messages;
based on cost information associated with sending the plurality of email messages to the plurality of recipient domains from the plurality of MTAs, the cost information indicating both latency associated with processing one or more email messages by one or more of the plurality of MTAs, and latency associated with receipt of the one or more email messages by one or more remote hosts, determine a lowest cost MTA for sending each of the one or more batches of email messages;
send each of the one or more batches of email messages using the lowest cost MTA; and
update, responsive to sending each of the one or more batches of email messages, one or more of the process flags for the lowest cost MTA to reflect that each of the one or more batches of email messages have been sent.

13. The system of claim 12, wherein the plurality of MTAs are geographically distant from each other.

14. The system of claim 12, wherein the cost information associated with sending the plurality of email messages is determined by the plurality of MTAs.

15. The system of claim 12, wherein the cost information includes delivery latency information.

16. The system of claim 12, wherein the cost information indicates response times of the plurality of recipient domains to inquiries made from the plurality of MTAs.

17. The system of claim 12, wherein the at least one email processing module is further configured to calculate the cost information for sending each email message of the plurality of email messages to the plurality of recipient domains.

18. The system of claim 17, wherein the at least one email processing module is further configured to store the calculated cost information at the at least one email data store.

19. The system of claim 17, wherein the at least one email processing module is further configured to send a ping message to the plurality of recipient domains in order to calculate the cost information for sending the each email message of the plurality of email messages to the plurality of recipient domains.

20. The system of claim 12, wherein the at least one email processing module is further configured to:
identify the plurality of recipient domains for the plurality of email messages; and
arrange the plurality of email messages based at least in part upon the plurality of identified recipient domains, and
send the arranged plurality of email messages to the lowest cost MTA for each of the plurality of identified recipient domains.

21. The system of claim 12, wherein the at least one email processing module is implemented in the at least one data store device.

22. The method of claim 11, wherein the cost information is based on one or more data objects in the database.

* * * * *